United States Patent
Khandelwal et al.

(10) Patent No.: US 11,954,333 B2
(45) Date of Patent: Apr. 9, 2024

(54) SECURED FIRMWARE WITH ANTI-MALWARE

(71) Applicant: Western Digital Technologies, Inc., San Jose, CA (US)

(72) Inventors: Aarshiya Khandelwal, Malegaon (IN); Vinay Kumar, Bangalore (IN); Nagarajan Ragupathy, Bangalore (IN); Rinkal Patel, Valsad (IN)

(73) Assignee: Western Digital Technologies, Inc., San Jose, CA (US)

( * ) Notice: Subject to any disclaimer, the term of this patent is extended or adjusted under 35 U.S.C. 154(b) by 27 days.

(21) Appl. No.: 17/356,206

(22) Filed: Jun. 23, 2021

(65) Prior Publication Data

US 2022/0413711 A1  Dec. 29, 2022

(51) Int. Cl.
| | |
|---|---|
| *G06F 3/06* | (2006.01) |
| *G06F 8/65* | (2018.01) |
| *G06F 21/50* | (2013.01) |
| *G06F 21/55* | (2013.01) |
| *G06F 3/12* | (2006.01) |
| *G06F 21/57* | (2013.01) |

(52) U.S. Cl.
CPC .......... *G06F 3/0619* (2013.01); *G06F 3/0656* (2013.01); *G06F 3/0659* (2013.01); *G06F 8/65* (2013.01); *G06F 21/554* (2013.01); *G06F 3/123* (2013.01); *G06F 21/50* (2013.01); *G06F 21/572* (2013.01)

(58) Field of Classification Search
CPC .... G06F 3/0619; G06F 3/0656; G06F 3/0659; G06F 3/0676; G06F 3/0679; G06F 8/65; G06F 21/554; G06F 2221/034
See application file for complete search history.

(56) References Cited

U.S. PATENT DOCUMENTS

| | | |
|---|---|---|
| 7,870,394 B2 | 1/2011 | Repasi et al. |
| 8,621,620 B2 | 12/2013 | Sallam |
| 2011/0029726 A1* | 2/2011 | Fujimoto ............ G06F 11/1433 711/170 |

(Continued)

OTHER PUBLICATIONS

An article titled "Peer-to-Peer Communication Across Network Address Translators" by Ford et al., from the 2005 USENIX Annual Technical Conference description 3.2. (Year: 2005).*

(Continued)

*Primary Examiner* — Michael Krofcheck
*Assistant Examiner* — Janice M. Girouard
(74) *Attorney, Agent, or Firm* — PATENT LAW WORKS LLP

(57) ABSTRACT

A data storage device and method for detecting malware on a data storage device. The device includes a non-volatile storage medium configured to store at least one file system control block and user data block(s) to store user data. The file system control block comprises at least one reference data structure. The data storage device further comprises a buffer to temporarily store user data. The data storage device further comprises a controller to scan each write command in the user data to be transferred for protocol commands or malicious data. The controller also stops the data transfer of user data from the buffer to the non-volatile storage medium if at least one of protocol commands or malicious data is detected in at least one write command.

20 Claims, 7 Drawing Sheets

(56) References Cited

U.S. PATENT DOCUMENTS

| | | | | |
|---|---|---|---|---|
| 2012/0144489 | A1* | 6/2012 | Jarrett | G06F 9/45558 |
| | | | | 726/24 |
| 2013/0047031 | A1* | 2/2013 | Tabone | G06F 11/1417 |
| | | | | 714/15 |
| 2014/0089617 | A1* | 3/2014 | Polzin | G06F 12/1441 |
| | | | | 711/E12.091 |
| 2016/0089607 | A1* | 3/2016 | Ike | G07F 17/3211 |
| | | | | 463/29 |
| 2017/0295503 | A1* | 10/2017 | Govindaraju | H04W 4/38 |
| 2017/0310686 | A1* | 10/2017 | Ray | H04L 63/08 |
| 2020/0193023 | A1* | 6/2020 | Olarig | G06F 21/79 |
| 2021/0218825 | A1* | 7/2021 | Sharma | H04L 41/082 |
| 2022/0107737 | A1* | 4/2022 | Choi | G06F 3/0622 |

OTHER PUBLICATIONS

A Mitre online document last modified Jul. 19, 2019 attached to this office action available online at https://web.archive.org/web/20210624010642/https://attack.mitre.org/tactics/TA0002/ (Year: 2019).*
An article titled Non-volatile Memory—What Does Non-Volatile Memory (NVM) Mean? that discloses it is widely used in memory chips for USB memory sticks and digital cameras. (Year: 2017).*
An article titled 'File I/O Using FS Macros—A typical Scenario' published by IBM and available online at https://www.IBM.com/docs/en/zvm/7.1?topic=macros-file-io-using-fs-typical-scenario. (Year: 2021).*
A screen shot of the Storage Networking Industry Association (SNIA) dictionary defintion of the term "partition" captured by archive.org on Aug. 8, 2019. (Year: 2019).*

* cited by examiner

SECURED FIRMWARE WITH ANTI-MALWARE

TECHNICAL FIELD

Aspects of the disclosure relate generally to data storage device and, more specifically, to systems and methods for detecting malware on a data storage device.

BACKGROUND

Cyber attacks are rife in the modern world and cyber attackers (or hackers) often attack the firmware of a data storage device. Cyber attacks also include injecting malware on to the data storage device. Many low-level hackers are also capable of using vendor-specific commands to corrupt a file system of a data storage device to change the configuration files or add unknown patches of code in the control blocks. This changes the device's control code.

Consequently, a device that is attacked appears and behaves differently. Since third-party anti-malware tools of the prior art cannot access a drive's firmware or control blocks, such anti-malware tools cannot detect malware present in the firmware and/or control blocks. Therefore, such malware can remain inside a data storage device which compromises the security, integrity and user experience of such a device.

SUMMARY

Disclosed herein is a data storage device comprising: a non-volatile storage medium configured to store: at least one file system control block, the file system control block comprising: at least one reference data structure; and user data block(s) to store user data; a buffer to temporarily store user data transferred from the host computer system to the non-volatile storage medium; a controller configured to: scan, from the buffer, each write command in the user data to be transferred for protocol commands or malicious data, wherein scanning comprises comparing each write command to records in the at least one reference data structure; stop the data transfer of user data from the buffer to the non-volatile storage medium if at least one of protocol commands or malicious data is detected in at least one write command.

In some embodiments, responsive to detection of at least one of the protocol commands or malicious data, the device controller of the data storage device is further configured to write details of the detected protocol commands or malicious data to an error log.

The device controller is further configured to display a message on a display interface associated with the data storage device, the message prompting a user associated with the data storage device whether to: continue with the data transfer of user data from the buffer to the non-volatile storage medium; or delete the user data from the buffer.

In some embodiments, the at least one reference data structure comprises a malware signatures data structure to store malware signatures of malicious software and/or malicious code.

In some embodiments, the at least one reference data structure comprises a protocol commands data structure to store protocol commands.

In some embodiments, the at least one reference data structure comprises a malicious file extensions and uniform resource locator's (URL) schemes data structure to store data indicative of malicious file extensions and URL schemes.

In some embodiments, the at least one reference data structure comprises a digital signatures data structure to store digital signatures or keyed hash message authentication code data indicative of authorized firmware.

In some embodiments, the data storage device further comprises a write-protect switch.

Disclosed herein is a data storage device comprising: a non-volatile storage medium configured to store: at least one file system control block, the file system control block comprising: firmware of the data storage device; and at least one reference data structure; user data block(s) to store user data; a controller configured to: scan firmware stored on the file system control block for malicious data and safe data, wherein scanning comprises comparing the firmware to the at least one reference data structure to determine the malicious data and remaining safe data; if malicious data is detected in the file system control block: compact any remaining safe data to a destination data block in the non-volatile storage medium; and securely erase the malicious data from the file system control block; generate at least one digital signature for firmware in the at least one file system control block; compare the at least one digital signature to the at least one reference data structure; transmit a notification to a user of the data storage device if the at least one digital signature does not match with a digital signature in the at least one reference data structure.

In some embodiments, comparing the firmware to the at least one reference data structure comprises comparing the firmware to a malicious file extensions and uniform resource locator's (URL) schemes data structure to detect malicious file extensions and URL schemes in the firmware.

In some embodiments of the data storage device, comparing the at least one digital signature to the at least one reference data structure comprises comparing the at least one digital signature to a digital signatures data structure to detect digital signatures data stored in the digital signatures data structure.

In some embodiments, the notification comprises information prompting a user associated with the data storage device to update the firmware. In some embodiments the notification comprises a message prompting the user to authorize a full flash update of the firmware stored on the file system control block.

In some embodiments, the data storage device is associated with a write-protect switch, and wherein the controller is configured to scan the firmware stored on the file system control block responsive to the write-protect switch being disabled.

In some embodiments of the data storage device, responsive to the user authorizing a full flash update of the firmware, the controller is further configured to: enable the write-protect switch for the file system control block.

In some embodiments, responsive to the controller detecting the at least one digital signature does not match with a digital signature in the at least one reference data structure, the controller is further configured to: update the at least one reference data structure to store malware signatures indicative of the detected malicious data.

In some embodiments, responsive to the controller detecting the at least one digital signature does not match with a digital signature in the at least one reference data structure, the controller is further configured to: update the firmware.

In some embodiments of the data storage device, the file system control block further comprises configuration files of the data storage device, and the controller is configured to: update the configuration files responsive to the user authorizing the full flash update of the firmware.

In some embodiments, the controller is configured to restore original configuration files on the file system control block during the full flash update of the firmware.

Disclosed herein is a data storage device comprising: means for storing at least one file system control block, the file system control block comprising: at least one reference data structure; and user data block(s) to store user data; a buffer to temporarily store user data transferred from the host computer system to the means for storing the at least one file system control block; means for scanning, from the buffer, each write command in the user data to be transferred for protocol commands or malicious data, wherein scanning comprises comparing each write command to records in the at least one reference data structure; means for stopping the data transfer of user data from the buffer to the means for storing at least one file system control block if at least one of protocol commands or malicious data is detected in at least one write command.

Disclosed herein is a method of detecting malicious software at the firmware interface. The method comprises sending user data to be written to the data storage device. The method includes temporarily storing the user data and scanning each write command in the user data for protocol commands or malicious data. The method further comprises detecting protocol commands or malicious data in the write command. The method further comprises stopping the data transfer of the user data to the non-volatile storage medium if at least one of protocol commands or malicious data is detected in at least one write command.

Disclosed herein is a method of detecting malicious data in firmware. The method comprises scanning firmware for malicious data and safe data by comparing the firmware to the at least one reference data structure to determine the malicious data and remaining safe data. The method further comprises detecting malicious data. If malicious data is detected. The method comprises compacting any remaining safe data to a destination data block. The method further comprises securely erasing the malicious data. If no malicious data is detected, the method comprises performing an integrity check of the firmware. The method further comprises generating at least one digital signature for firmware in the at least one file system control block. The method further comprises comparing the at least one digital signature to the at least one reference data structure. The method further comprises determining whether there is a match between the at least one digital signature and the at least one reference data structure. If there is not a match, the method comprises transmitting a notification to a user of the data storage device.

BRIEF DESCRIPTION OF DRAWINGS

Examples of the present disclosure will now be described with reference to the following drawings.

DESCRIPTION OF EMBODIMENTS

Overview of the First Example of the Data Storage Device System 2

Figure 1:
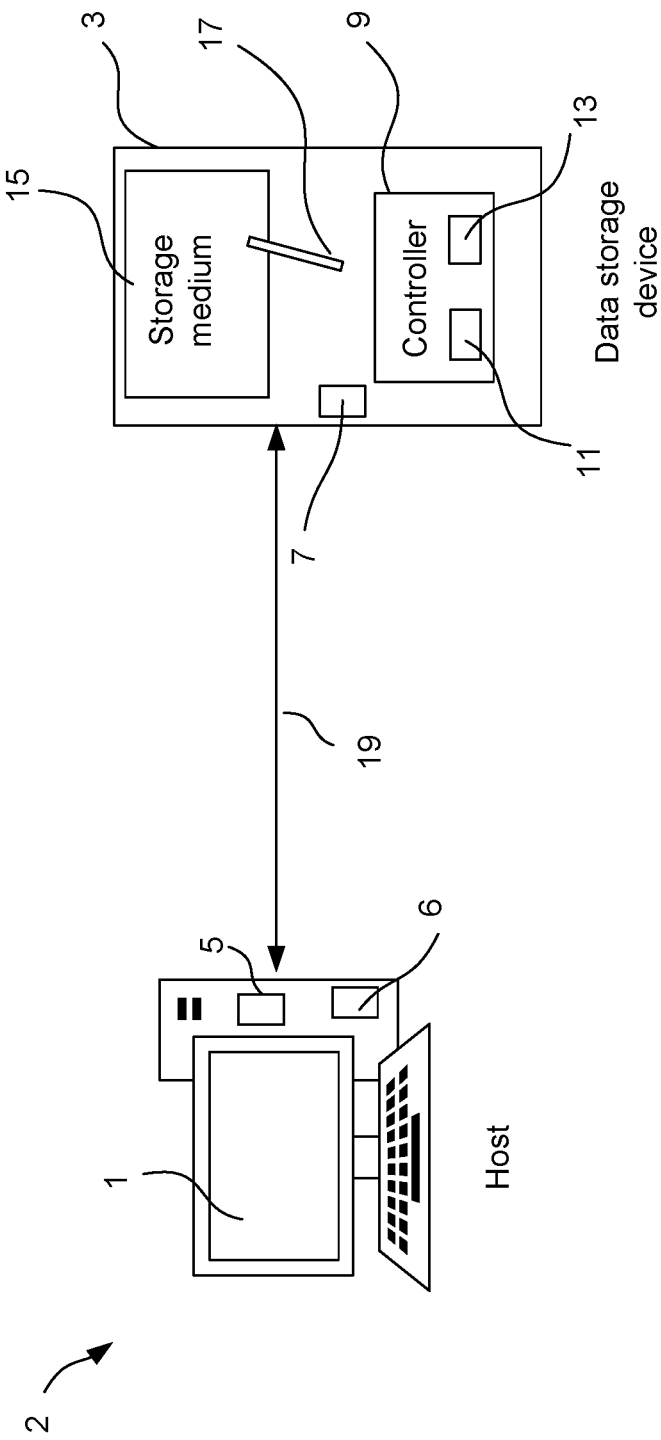
FIG. 1 is a schematic diagram of a data storage device system.

FIG. 1 illustrates a data storage device system 2 according to an embodiment. System 2 includes a host computer system 1 and a data storage device 3 connected to the host computer system 1. The host computer system 1 can include a computer, such as desktop computer, laptop computer, tablet, portable communication device, media player, or other electronic devices that can host peripheral devices. The host computer system 1 may comprise a processor 5 and a memory 6. In some examples, the data storage device 3 may comprise a solid state drive (SSD) or hard disk drive (HDD). The data storage device 3 may be connected to the host computer system 1 via a data link 19, such as Fibre Channel (FC), Serial ATA (SATA), Serial Attached SCSI (SAS) or others.

In some examples data storage device 3 may be located within the host computer system 1 or outside host computer system 1, such as on a separate rack in a server room, in a cloud storage architecture, or connected as an external drive using industry standards such as universal serial bus (USB) or Firewire connectors.

The data storage device 3 comprises a non-volatile storage medium 15. The non-volatile storage medium 15 is configured to store at least one file system control block. The data storage device 3 may also comprise a read/write device 17 to store the at least one file system control block or other data on the non-volatile storage medium. The file system control block comprises at least one reference data structure, datastore or database. The reference data structure may comprise data relating to malware signatures, protocol commands, malicious file extensions, uniform resource locator's schemes, digital signatures or keyed hash message authentication code (HMAC).

The non-volatile storage medium 15 also comprises at least one user data block to store user data. The data storage device 3 also comprises a buffer 7 to temporarily store user data transferred from the host computer system 1 to the non-volatile storage medium 15. In some examples the buffer 7 is a volatile memory such as random-access memory (RAM). As illustrated in FIG. 1, the buffer 7 is stored on the data storage device 3 separately to the non-volatile storage medium.

In other examples the buffer 7 may be stored within the non-volatile storage medium. In this way, the non-volatile storage medium 15 may be partitioned so that a partition of the non-volatile storage medium may be used as a buffer (volatile memory).

The data storage device 3 further comprises a controller 9. The controller 9 may comprise hardware circuitry 11, such as a microcontroller, to perform steps such as scanning, from the buffer 7, each write command in the user data to be transferred for protocol commands or malicious data. Scanning from the buffer 7 comprises comparing each write command to records in the at least one reference data structure. In some examples this may include comparing each write command in the user data to protocol commands data structure or a malware signature data structure.

The hardware circuitry 11 associated with the controller 9 is also configured to stop the data transfer of user data from the buffer 7 to the non-volatile storage medium 15 if at least one of protocol commands or malicious data is detected in at least one write command.

The controller 9 may further comprise program memory 13. In this way, the steps performed by the controller are implemented as source code, compiled, and written onto program memory 13 as machine code.

First Example of the Data Storage Device 3

Additional features of the data storage device 3 will now be described.

Non-Volatile Storage Medium 15

Figure 2:
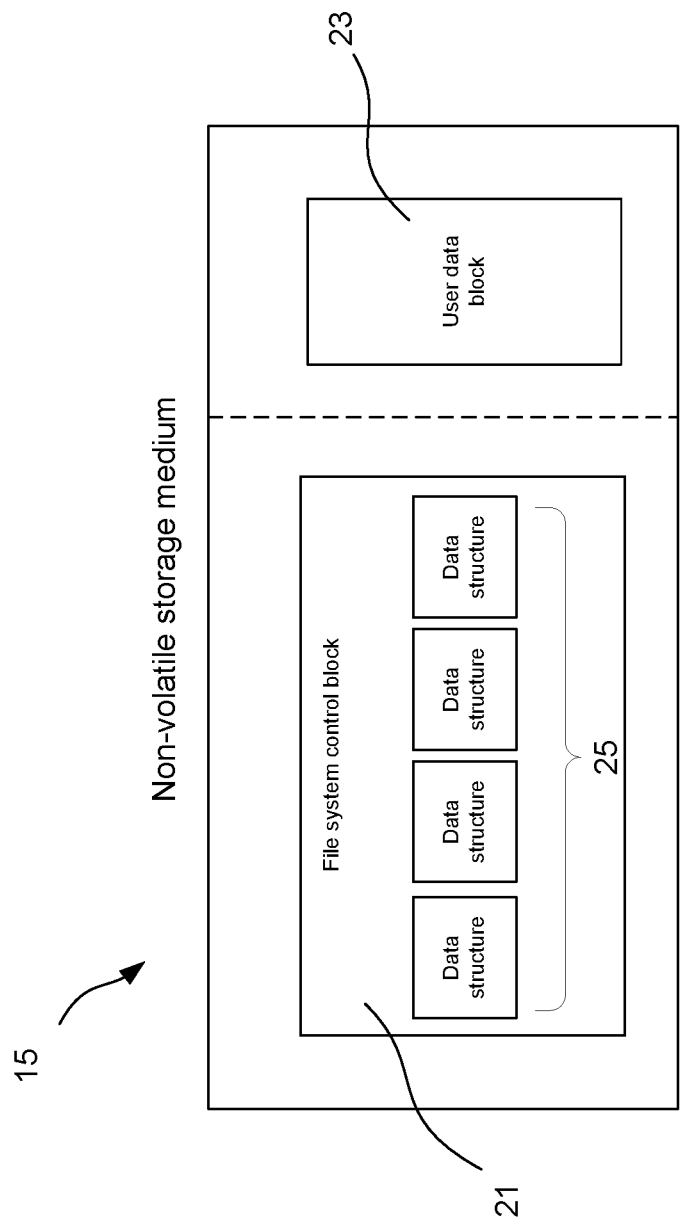
FIG. 2 is a schematic diagram of a non-volatile storage medium.

FIG. 2 illustrates a schematic diagram of the non-volatile storage medium 15 that is stored on the data storage device 3. As described above, the non-volatile storage medium 15 comprises at least one file system control block 21. The file system control block 21 may comprise firmware associated with the data storage device 3 and/or host computer system 1. In one example a file system control block 21 comprises a data structure that is allocated by an operating system of the host computer system. The file system control block 21 may include information about data associated with the host computer system 1, data storage device 3 or other storage or device associated with the system 2.

As illustrated in FIG. 2, the non-volatile storage medium 15 may be partitioned so that the file system control block 21 is in a separate partition to the user data block 23. In some examples, this separation enables the data storage device 3 to control the file system control block 21 and the operating system of the host computer system to control the user data block 23.

Figure 7:
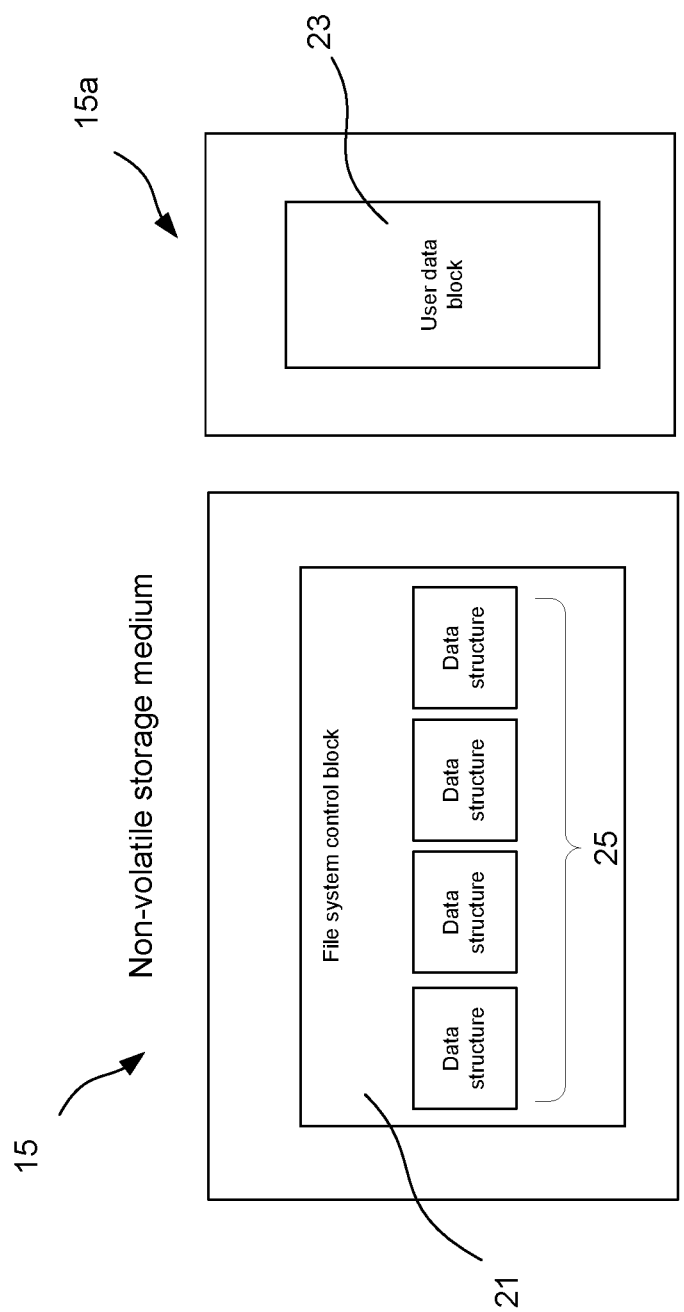
FIG. 7 is a schematic diagram of a further embodiment of a non-volatile storage medium.

In other examples the user data block 23 may be stored in a separate storage medium 15a located within the data storage device 3 as illustrated in FIG. 7.

The user data block 23 may comprise a write-protect switch. The write-protect switch may comprise a physical switch that can be toggled by a user of the host computer system 1. Alternatively the write-protect switch may be toggled by an authorized entity such as a vendor or manufacturer of the host computer system 1 or data storage device 3.

In some examples the at least one file system control block may also comprise a write-protect switch. The write-protect switch may be associated with the non-volatile storage medium 15. In some examples the write-protect switch may comprise a physical switch that can be toggled by a user of the data storage device 3. Alternatively the physical switch may be toggled by an authorized entity such as a vendor or manufacturer of the data storage device 3.

In other examples the write-protect switch may be associated with firmware and/or software stored on the file system control block 21. In this way, the write-protect switch associated with firmware/software may be enabled as default, for example by an authorized entity such as the vendor or manufacturer of the device 3. In some examples, the write-protect switch may be enabled during an authorized firmware update. In another example the write-protect switch may be enabled upon authorization from a server or device associated with the manufacturer or vendor. In yet another example the user may enable the write-protect switch.

In this way, the write-protect switch prevents data being written to control blocks by an attacker or malicious software/code. In some examples the write-protect switch may be enabled by default. In some examples the write-protect switch may be enabled by way of input by a user of the data storage device 3 or host computer system 1. In some examples the device may be configured or manufactured such that a user cannot disable the write-protect switch.

The non-volatile storage medium 15 also comprises at least one user data block 23 to store user data. An example of user data may comprise data that a user of the host computer system 1 intends to transfer from the host computer system 1 to the data storage device 3.

As also described above the file system control block 21 of the non-volatile storage medium 15 may further comprise at least one reference data structure 25. The at least one reference data structure may comprise a malware signatures data structure to store malware signatures of malicious software and/or malicious code. The malware signatures may comprise a unique sequence of values that indicate the presence of malicious software/code. The malware signatures may also comprise a hash value.

In other examples the malware signatures may be algorithm-based. Malware signatures may also be based on cryptographic algorithms such as asymmetric cryptographic algorithms.

The malware signatures data structure may also comprise digital signatures of other data related to the malicious software and/or malicious code. Examples of other data include files, links and/or commands.

The at least one reference data structure may also comprise a protocol commands data structure to store protocol commands. The protocol commands data structure may comprise protocol level commands such as Serial Advanced Technology Attachment (SATA), Small Computer System Interface (SCSI) or Non-Volatile Memory Express (NVMe). The protocol commands may also include Serial Attached SCSI (SAS), Peripheral Component Interconnect Express (PCIe).

The at least one reference data structure may also comprise a malicious file extensions and uniform resource locator's (URL) schemes data structure to store data indicative of malicious file extensions and URL schemes. This may comprise specific file extensions that are indicative of malicious software/code, such as: EXE, COM, BAT, CMD, MSI, SCR, PDF, VB, VBS, RTF, DOC, XLS, JPEG and ZIP, WS, WSF, SCF, PIF. The data structure may also comprise examples of URL schemes that are known to be malicious.

Some examples of URL schemes may comprise command-and-control, malware, phishing, grayware, dynamic-domain name system (dns), newly-registered-domain, copyright-infringement, extremism, proxy-avoidance-and-anonymizers and parked.

The at least one reference data structure may also comprise a digital signatures data structure to store digital signatures or keyed hash message authentication code (HMAC) data indicative of firmware. In some examples this may be referred to as a digital/HMAC signatures data structure. In one example the digital/HMAC signatures data structure may comprise digital signatures of firmware that is known to the data storage device 3 and/or host computer system 1. The digital/HMAC signatures data structure may comprise digital signatures or firmware that is known to devices associated with the data storage device 3 and/or host computer system 1.

In some examples, the malware signatures data structure, protocol commands data structure, malicious file extensions and URL schemes data structure and digital/HMAC signatures data structure may be stored as distinct data structures. In other examples the data structures may be stored as one data structure.

Detection of Protocol Commands or Malicious Data

As described above the controller 9 of the data storage device 3 is configured to stop the data transfer of the user data from the buffer 7 to the non-volatile storage medium 15 if at least one of protocol commands or malicious data is detected in at least one write command. Examples of detected protocol commands may include protocol level commands such as Serial Advanced Technology Attachment (SATA), Small Computer System Interface (SCSI) or Non-Volatile Memory Express (NVMe). The protocol commands may also include Serial Attached SCSI (SAS), Peripheral Component Interconnect Express (PCIe) or Secure Digital (SD) Protocol.

Examples of malicious data may include malicious software and/or malicious code. Malicious software and malicious code may refer to any software, program or code that has the potential to cause harm to a device, computer system or network. Examples of malicious software/malicious code include ransomware, spyware, adware, Trojan horse, worms, rootkits, keyloggers or bots. Malicious software and malicious code may refer to any software, program or code that may cause harm to the data storage device 3 or host computer system 1. Malicious software and malicious code may also refer to a software, program or code that may cause harm to a network associated with the data storage device 3 or host computer system 1.

In some examples the malicious data may be configured to perform unsolicited tasks such as deleting data, stealing data or adding/installing software without consent.

In some examples, responsive to detection of at least one of the protocol commands or malicious data, the device controller 9 of the data storage device 3 may be configured to write details of the detected protocol commands or malicious data to an error log. The error log may comprise a Self-Monitoring, Analysis and Reporting Technology (SMART) log. In other examples the error log may comprise a Design for Debug (DFD), Failure Analysis (FA) or any Data Block. The error log may be located on the data storage device 3. In other examples the error log may be located on the host computer system 1. In yet another example the error log may be located on another data storage device or computer system.

In some examples the device controller 9 may further be configured to display a message on a display interface associated with the data storage device 3. The display interface may be associated with the host computer system 1 or another device associated with the host computer system 1, such as a desktop computer, laptop computer, tablet, portable communication device, media player, mobile phone, or other electronic device.

The message displayed on the display interface may include details of the user data. The message may further include details of the at least one of protocol commands or malicious data that is detected in the at least one write command.

The message displayed on the display interface may prompt the user whether to: continue with the data transfer of user data from the buffer 7 to the non-volatile storage medium 15 or delete the user data from the buffer 7. In this way, the user may override the controller stopping the data transfer of user data from the buffer 7 to the non-volatile storage medium 15. This may be useful in examples where the controller 9 has erroneously detected protocol commands or malicious data in the user data to be transferred from the host computer system 1 to the non-volatile storage medium 15.

In some examples the device controller 9 may be configured to continue transferring the user data from the buffer 7 to the non-volatile storage medium of the data storage device 3.

Method 100 of Detecting Malicious Software

Figure 3:
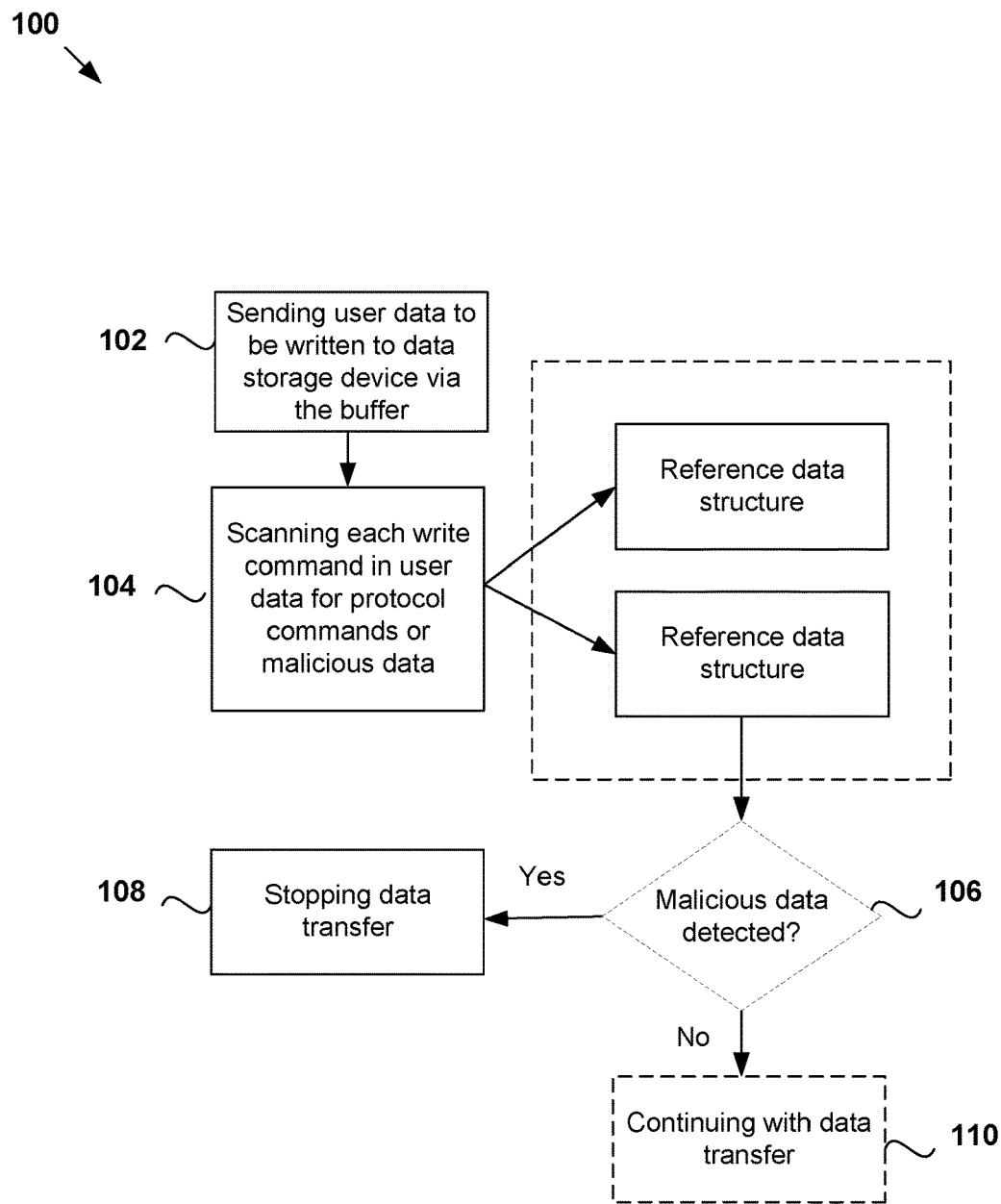
FIG. 3 is a flow diagram of a method of detecting malicious software at the firmware interface of the data storage device system of FIG. 1.

FIG. 3 illustrates a method 100 of detecting malicious software at the firmware interface. The method comprises sending 102 user data to be written to the data storage device 3. The user data may be written from a host computer system 1 to a non-volatile storage medium 15 of the data storage device 3. As described above the data storage device 3 comprises a buffer 7 to temporarily store user data. In the method 100, the buffer 7 temporarily stores the user data that is to be written to the non-volatile storage medium 15.

The non-volatile storage medium 15 used in the method 100 is configured to store at least one file system control block. The file system control block comprises at least one reference data structure and user data block(s) to store the user data.

The data storage device 3 further comprises a controller 9. In this way, the controller 9 is configured to perform at least some of the steps of the method, including scanning 104 each write command in the user data for protocol commands or malicious data. As described above, scanning 104 comprises scanning each write command in the user data from the buffer 7. That is, scanning 104 the user data to be transferred from the host computer system 1 to the data storage device 3. As also described above scanning 104 comprises comparing each write command in the user data to records in the at least one reference data structure.

The method 100 further comprises detecting 106 protocol commands or malicious data in the write command. The method 100 further comprises stopping 108 the data transfer of the user data from the buffer 7 to the non-volatile storage medium 15 if at least one of protocol commands or malicious data is detected in at least one write command.

In some embodiments, the method 100 further comprises continuing 110 with the data transfer of user data from the buffer 7 to the non-volatile storage medium if no protocol commands or malicious data is detected in the at least one write command. In this way, the user data that is transferred from the buffer 7 to the non-volatile storage medium 15 is scanned for the presence of protocol commands and/or malicious data before being transferred. This ensures that the user data that is transferred to the data storage device is not malicious.

Overview of the Second Example of the Data Storage Device System 20

Figure 4:
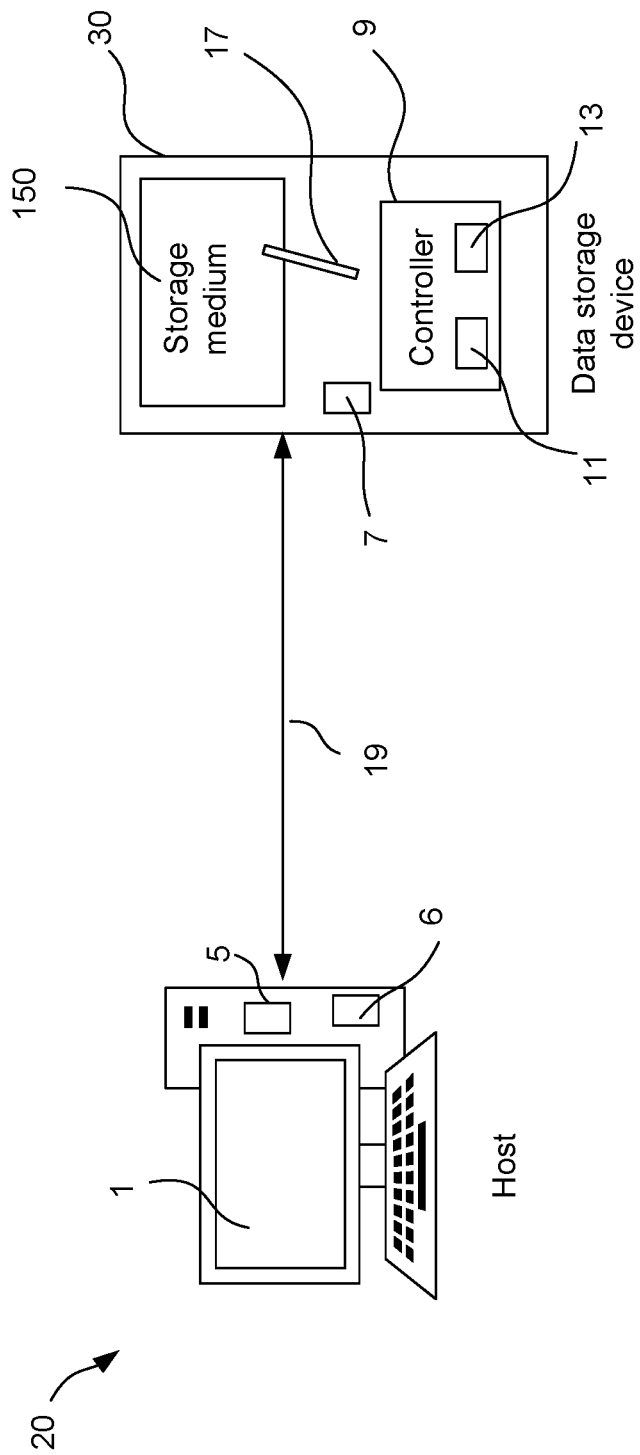
FIG. 4 is a schematic diagram of a further data storage device system.

FIG. 4 illustrates a data storage device system 20 according to a further embodiment. System 20 includes a host computer system 1 and a data storage device 30 connected to the host computer system 1. As with the host computer system of the data storage device system 2, the host computer system 1 may comprise a computer, such as desktop computer, laptop computer, tablet, portable communication device, media player, or other electronic devices that can host peripheral devices. The host computer system 1 may comprise a processor 5 and a memory 6. In some examples the data storage device 30 may comprise a solid state drive (SSD) or hard disk drive (HDD). The data storage device 30 may be connected to the host computer system 1 via a data link 19, such as Fibre Channel (FC), Serial ATA (SATA), Serial Attached SCSI (SAS) or others.

In some examples data storage device 30 may be located within the host computer system 1 or outside host computer system 1, such as on a separate rack in a server room, in a cloud storage architecture, or connected as an external drive using industry standards such as universal serial bus (USB) or Firewire connectors.

The data storage device 30 comprises a non-volatile storage medium 150. The non-volatile storage medium 150 is configured to store at least one file system control block. The data storage device 30 may also comprise a read/write device 17 to store the at least one file system control block or other data on the non-volatile storage medium 150. The file system control block comprises firmware of the data storage device 30. The file system control block further comprises at least one reference data structure, datastore or database. The reference data structure may comprise data relating to malware signatures, protocol commands, malicious file extensions, uniform resource locator's schemes, digital signatures or keyed hash message authentication code (HMAC).

The non-volatile storage medium 150 further comprises at least one user data block to store user data.

The data storage device 30 further comprises a controller 9. The controller 9 may comprise hardware circuitry 11, such as a microcontroller, to perform steps such as scanning firmware stored on the file system control block for malicious data and safe data. Scanning comprises comparing the firmware to the at least one reference data structure to determine the malicious data and remaining safe data.

If malicious data is detected in the file system control block, the hardware circuitry 11 associated with the controller 9 is configured to compact any remaining safe data to a destination data block in the non-volatile storage medium 150. The controller 9 is also configured to securely erase the malicious data from the file system control block.

The hardware circuitry 11 associated with the controller 9 is also configured to generate at least one digital signature for firmware in the at least one file system control block. The controller 9 is then configured to compare the at least one digital signature to the at least one reference data structure, and transmit a notification to a user of the data storage device 30 if the at least one digital signature does not match with a digital signature in the at least one reference data structure.

Second Example of the Data Storage Device 30

Additional features of the data storage device 30 will now be described.

Non-Volatile Storage Medium 150

Figure 5:
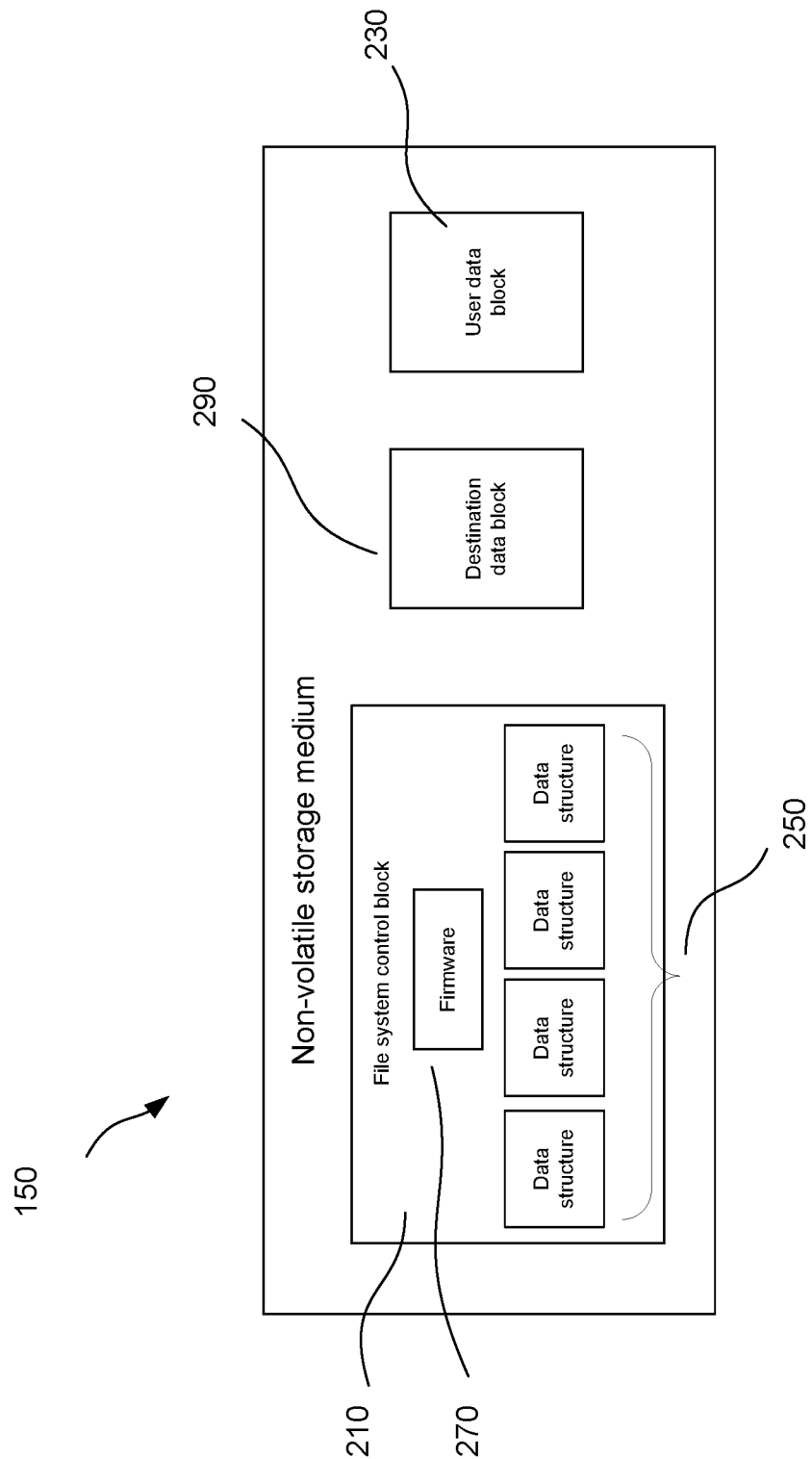
FIG. 5 is a schematic diagram of a further non-volatile storage medium.

FIG. 5 illustrates a schematic diagram of the non-volatile storage medium 150 that is stored on the data storage device 30. As described above, the non-volatile storage medium 150 comprises at least one file system control block 210. The file system control block 210 comprises firmware 270 of the data storage device 30. In some examples the file system control block 210 may also comprise firmware associated with the host computer system 1. The file system control block 210 may comprise a data structure that is allocated by an operating system of the host computer system. The file system control block 210 may also include information about data associated with the host computer system 1, data storage device 30 or other storage or device associated with the system 20. The file system control block may further comprise at least one configuration file.

The file system control block 210 further comprises at least one reference data structure 250. The at least one reference data structure may comprise a malware signatures data structure to store malware signatures of malicious software and/or malicious code. The malware signatures may comprise a unique sequence of values that indicate the presence of malicious software/code. The malware signatures may also comprise a hash value.

In other examples the malware signatures may be algorithm-based. Malware signatures may also be based on cryptographic algorithms such as asymmetric cryptographic algorithms.

The malware signatures data structure may also comprise digital signatures of other data related to the malicious software and/or malicious code. Examples of other data include files, links and/or commands.

The at least one reference data structure may also comprise a protocol commands data structure to store protocol commands. The protocol commands data structure may comprise protocol level commands such as Serial Advanced Technology Attachment (SATA), Small Computer System Interface (SCSI) or Non-Volatile Memory Express (NVMe). The protocol commands may also include Serial Attached SCSI (SAS), Peripheral Component Interconnect Express (PCIe).

The at least one reference data structure may also comprise a malicious file extensions and uniform resource locator's (URL) schemes data structure to store data indicative of malicious file extensions and URL schemes. This may comprise specific file extensions that are indicative of malicious software/code, such as: EXE, COM, BAT, CMD, MSI, SCR, PDF, VB, VBS, RTF, DOC, XLS, JPEG and ZIP, WS, WSF, SCF, PIF. The data structure may also comprise examples of URL schemes that are known to be malicious.

Some examples of URL schemes may comprise command-and-control, malware, phishing, grayware, dynamic-domain name system (dns), newly-registered-domain, copyright-infringement, extremism, proxy-avoidance-and-anonymizers and parked.

The at least one reference data structure may also comprise a digital signatures data structure to store digital signatures or keyed hash message authentication code (HMAC) data indicative of firmware. In some examples this may be referred to as a digital/HMAC signatures data structure. In one example the digital/HMAC signatures data structure may comprise digital signatures of firmware that is known to the data storage device 30 and/or host computer system 1. The digital/HMAC signatures data structure may comprise digital signatures or firmware that is known to devices associated with the data storage device 30 and/or host computer system 1.

In some examples, the malware signatures data structure, protocol commands data structure, malicious file extensions and URL schemes data structure and digital/HMAC signatures data structure may be stored as distinct data structures. In other examples the data structures may be stored as one data structure.

The user data block 230 may be protected by a write-protect switch. The write-protect switch may comprise a physical switch that can be toggled by a user of the host computer system 1. Alternatively the write-protect switch may be toggled by an authorized entity such as a vendor or manufacturer of the host computer system 1 or data storage device 30.

Furthermore, the file system control block of the non-volatile storage medium 150 may also be protected by another write-protect switch. The write-protect switch may be associated with the non-volatile storage medium 150. In some examples the write-protect switch may comprise a physical switch that can be toggled by a user of the data storage device 30. Alternatively the physical switch may be toggled by an authorized entity such as a vendor or manufacturer of the data storage device 30.

In other examples the write-protect switch may be associated with firmware and/or software stored on the file system control block 210. In this way, the write-protect switch associated with firmware/software may be enabled as default, for example by an authorized entity such as the vendor or manufacturer of the data storage device 30. In some examples, the write-protect switch may be enabled during an authorized firmware update. In another example the write-protect switch may be enabled upon authorization from a server or device associated with the manufacturer or vendor. In yet another example the user may enable the write-protect switch. In some examples the user may be authorized to enable the switch. In yet further examples, the write-protect switch may require a combination of the above, such as a user enabling a physical switch together with authorization from a server associated with the manufacturer.

In this way, the write-protect switch prevents data being written to the control blocks by an attacker or malicious software/code. In some examples the write-protect switch may be enabled by default. In other examples the write-protect switch may be enabled by way of input by a user of the data storage device 30 or host computer system 1.

In some examples, the controller 9 may be configured to scan the firmware stored on the file system control block for malicious data and safe data responsive to the write-protect switch being found to be disabled. That is, during operation of the data storage device 30, if the write-protect switch is found to be disabled the controller 9 may be configured to scan the firmware.

In other examples, the controller 9 may be configured to scan the firmware for malicious data and safe data responsive to an internal garbage collection operation. The controller 9 may also be configured to scan the firmware for malicious data and safe data during idle time.

Scanning Firmware for Malicious Data and Safe Data

As described above the controller 9 of the data storage device 30 is configured to scan firmware 270 stored on the file system control block 210 for malicious data and safe data. Examples of malicious data may include malicious software and/or malicious code. Malicious software and malicious code may refer to any software, program or code that has the potential to cause harm to a device, computer system or network. Examples of malicious software/malicious code include ransomware, spyware, adware, Trojan horse, worms, rootkits, keyloggers or bots. Malicious software and malicious code may refer to any software, program or code that may cause harm to the data storage device 3 or host computer system 1. Malicious software and malicious code may also refer to a software, program or code that may cause harm to a network associated with the data storage device 3 or host computer system 1.

In some examples the malicious data may be configured to perform unsolicited tasks such as deleting data, stealing data or adding/installing software without consent.

In one example, comparing the firmware to the at least one reference data structure may comprise comparing the firmware to a malicious file extensions and URL schemes data structure to detect malicious file extensions and URL schemes in the firmware.

Safe data may comprise data, software and/or code that is known to the controller 9. Safe data may also comprise data, software and/or code that is determined to be safe responsive to the scanning of the firmware. For example, the controller 9 may scan the firmware and determine the safe data based on the result of comparing the firmware to the at least one reference data structure.

As described above, if malicious data is detected in the file system control block 210 the controller is configured to compact any remaining safe data to a destination data block in the non-volatile storage medium. An example of the destination data block 290 is illustrated in FIG. 5. Compacting the safe data may comprise reducing the size of the remaining safe data without the loss of information, for example by removing redundant data from the remaining safe data. A compaction table may be used to compact the safe data. In some examples the data compaction may be performed using a probabilistic or statistical method. In another example compacting the safe data may comprise compressing the safe data.

Data compaction may also comprise scanning the file system control block to identify safe data. That is, data that does not match with any malware signature in the at least one reference data structure. The safe data may be copied from the file system control block and stored in a new data block. The new data block may be the destination data block 290.

In this way, compacting the safe data to the destination block 230 ensures that a copy of the safe data is stored on the non-volatile storage medium 150.

As also described above, if malicious data is detected in the file system control block the controller 9 is also configured to securely erase the malicious data from the file system control block 210. This may comprise the controller 9 automatically deleting the detected malicious data from the file system control block 210. In other examples this may comprise the controller 9 deleting the detected malicious data from the file system control block 210 via a software removal tool.

In some examples deleting the detected malicious data from the file system control block may comprise securely erasing the specific data block that the malicious data is detected on. This may be preceded by data compaction of the file system control block.

If malicious data is not detected in the file system control block the controller 9 is configured to perform an integrity check of the firmware. In some examples the controller 9 also performs an integrity check of the firmware and configuration files that are stored on the file system control block. The integrity check is described below with reference to generating the at least one digital signature and comparing it to at least one reference data structure.

The controller 9 is further configured to generate at least one digital signature for firmware in the at least one file system control block 210. In some examples the controller 9 generates the digital signature before scanning the firmware for malicious data. In other examples the controller 9 generates the digital signature after scanning the firmware for malicious data.

In one example the digital signature that is generated for the firmware is based on asymmetric cryptographic algorithms such as the Elliptic Curve Digital Signature Algorithm (ECDSA). The digital signature may also comprise digital certificates issued by a trusted certificate authority (CA). The digital signatures may comprise hash values.

As described above the controller 9 is further configured to compare the at least one digital signature to the at least one reference data structure. In some examples this may comprise comparing the at least one digital signature to a digital signatures data structure which stores digital signatures or keyed HMAC data as described above. In this way the controller 9 may compare the at least one digital signature of the firmware to digital signatures of firmware that are known to the data storage device 30 and/or host computer system 1 (or other associated devices).

In some examples, the controller 9 may be configured to update the at least one reference data structure if the at least one digital signature of the firmware does not match with a digital signature in the at least one reference data structure. That is, the controller 9 may update the at least one reference data structure with the digital signature of the firmware so that the digital signature of the firmware is stored on the at least one data structure.

The controller 9 may also be configured to update the malware signatures data structure with data indicative of the detected malicious data, such as the malware signatures of the malicious data. In some examples, the controller 9 may update the malware signatures data structure during a full flash update of the firmware.

In some examples, the controller 9 may be configured to restore configuration files data responsive to the controller 9 detecting the at least one digital signature does not match with a digital signature in the at least one reference data structure.

Alternatively, if no malicious data is detected in the firmware, the controller 9 is configured to enable normal operations of the data storage device 30. This may include configuring the controller 9 to continue with the data storage device operations if the at least one digital signature of the firmware matches with a digital signature in the at least one reference data structure.

Transmitting a Notification to a User

The controller 9 is also configured to transmit a notification to a user of the data storage device 30 if the at least one digital signature does not match with a digital signature in the at least one reference data structure. In some examples the notification may be displayed on a display interface associated with the data storage device 3. The display interface may be associated with the host computer system 1 or another device associated with the host computer system 1, such as a desktop computer, laptop computer, tablet, portable communication device, media player, mobile phone, or other electronic device.

The notification transmitted to the user may include details of the comparison of the at least one digital signature to the at least one reference data structure. For example, the notification may indicate that the comparison did not find a match with a digital signature in the at least one reference data structure, and may prompt the user to update the firmware. In a further example the notification may comprise a message prompting the user to authorize a full flash update (FFU) of the firmware stored on the file system control block.

In other examples the notification may comprise a message alerting the user of a suspicious file. The message in the notification may prompt the user whether to continue with the file transfer or discard the suspicious file.

As described above the data storage device 30 may be associated with a write-protect switch. In some examples, the controller 9 may be configured to enable the write-protect switch for the file system control block responsive to the user authorizing a full flash update of the firmware.

In other examples, the controller 9 may update the firmware without prompting the user for authorization. In this way, the controller 9 may update the firmware responsive to the controller detecting that the at least one digital signature does not match with a digital signature in the at least one reference data structure.

As described above the file system control block may further comprise configuration files of the data storage device 30. In some examples the controller 9 may be configured to update the configuration files responsive to the user authorizing a full flash update of the firmware.

In other examples the controller 9 may be configured to restore original configuration files on the file system control block during the full flash update of the firmware.

In other examples the controller 9 may be configured to update the at least one reference data structure to store malware signatures indicative of the detected malicious data during the full flash update of the firmware. This may occur responsive to the controller detecting the at least one digital signature does not match with a digital signature in the at least one reference data structure.

Method 300 of Scanning Firmware

Figure 6:
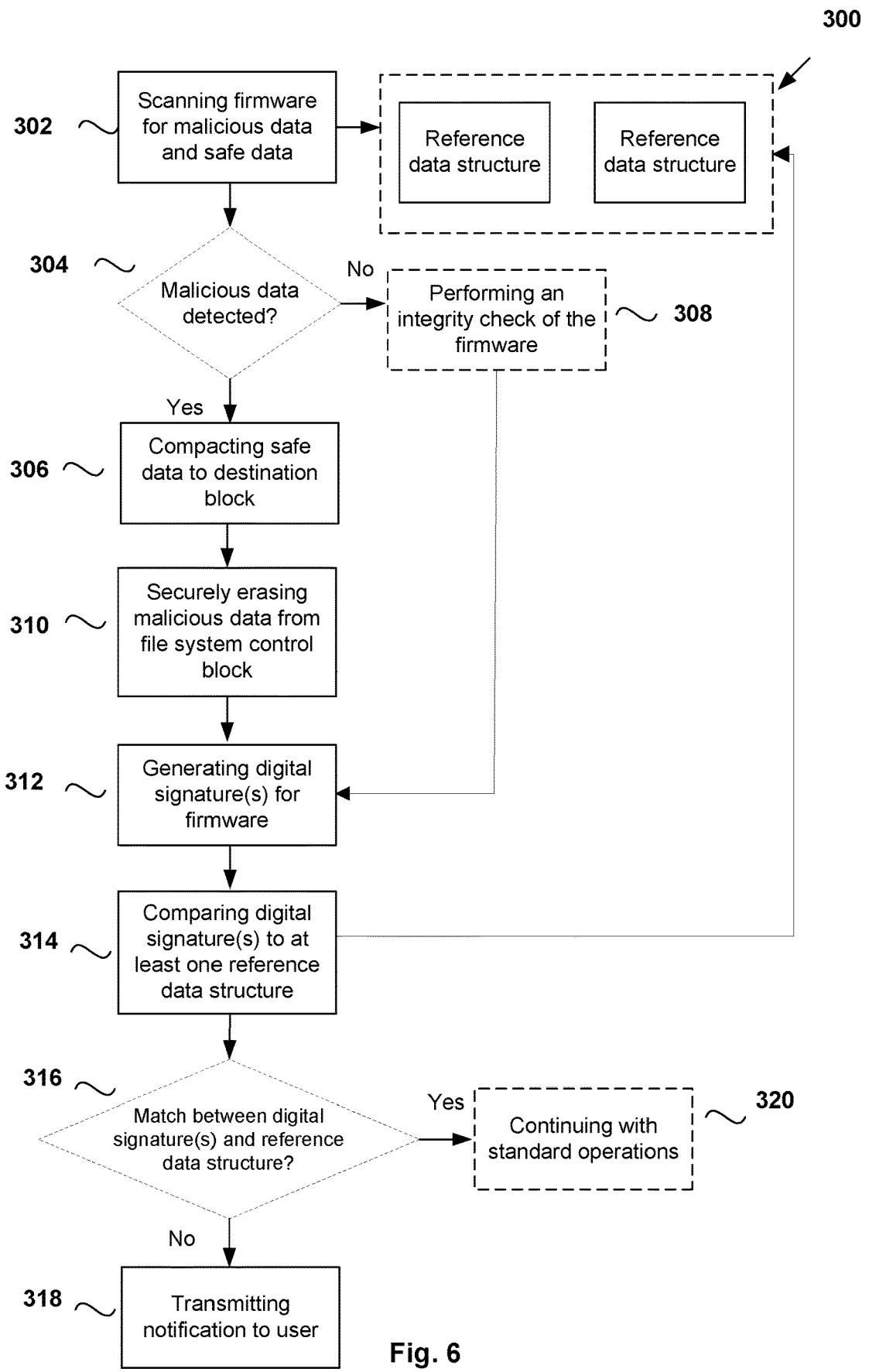
FIG. 6 is a flow diagram of a method of detecting and removing malicious software on control blocks of the data storage device system of FIG. 4.

FIG. 6 illustrates a method 300 of detecting malicious data in firmware. The method 300 detects malicious data in firmware stored on, for example, a non-volatile storage medium 150 of a data storage device 30. The non-volatile storage medium 150 is configured to store at least one file system control block. The file system control block comprises firmware of the data storage device 30 and at least one reference data structure. The non-volatile storage medium 150 further comprises user data block(s) to store user data.

The method 300 comprises scanning 302 firmware for malicious data and safe data. As described above scanning 302 comprises comparing the firmware to the at least one reference data structure to determine the malicious data and remaining safe data. This may comprise comparing the firmware to a malicious file extensions and URL schemes data structure to detect malicious file extensions and URL schemes in the firmware.

The method 300 further comprises detecting 304 malicious data. If malicious data is detected in the file system control block, the method comprises compacting 306 any remaining safe data to a destination data block in the non-volatile storage medium 30. The method further comprises securely erasing 310 the malicious data from the file system control block.

If no malicious data is detected in the file system control block, the method 300 comprises performing 308 an integrity check of the firmware. This may also include performing an integrity check of configuration files stored on the file system control block. This is described with reference to step 312 of the method 300 below.

After the step of securely erasing 310 the malicious data from the file system control block, the method 300 further comprises generating 312 at least one digital signature for firmware in the at least one file system control block.

The method 300 further comprises comparing 314 the at least one digital signature to the at least one reference data structure.

The method further comprises determining 316 whether there is a match between the at least one digital signature and the at least one reference data structure. If there is not a match, the method 300 comprises transmitting 318 a notification to a user of the data storage device 30. The notification may comprise a message indicating that there is not a match between the digital signature and the at least one reference data structure, and may therefore notify the user of an error with the firmware. The notification may prompt the user to update the firmware. If there is a match, the method comprises continuing 320 with normal operations of the data storage device 30 standard operations.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a non-volatile storage medium configured to store:
at least one file system control block, the file system control block comprising a first partition of the non-volatile storage medium configured to store:
firmware of the data storage device; and
at least one reference data structure comprised of records for protocol commands or malicious data; and
in a second partition of the non-volatile storage medium, user data blocks to store user data from a host computer system, wherein:
a device controller of the data storage device controls the at least one file system control block; and
the host computer system controls the user data blocks through storage commands to the data storage device;
a read/write device configured to write the user data blocks to the non-volatile storage medium;
a buffer configured to temporarily store user data transferred from the host computer system to the non-volatile storage medium; and
the device controller configured to:
receive, from the host computer system, a write command for user data for the user data blocks;
scan, from the buffer, the user data for the write command for protocol commands or malicious data, wherein scanning comprises comparing the user data for the write command to the records in the at least one reference data structure in the first partition; and
stop the data transfer of user data from the buffer to the second partition of the non-volatile storage medium responsive to at least one of protocol commands or malicious data being detected in the user data for the write command.

2. The data storage device of claim 1, wherein responsive to detection of at least one of the protocol commands or malicious data, the device controller is further configured to write details of the detected protocol commands or malicious data to an error log.

3. The data storage device of claim 1, wherein responsive to detection of at least one of the protocol commands or malicious data, the device controller is further configured to display a message on a display interface associated with the data storage device, the message prompting a user associated with the data storage device whether to:
continue with the data transfer of user data from the buffer to the non-volatile storage medium; or
delete the user data from the buffer.

4. The data storage device of claim 1, wherein the at least one reference data structure comprises a malware signatures data structure to store malware signatures of malicious software and/or malicious code.

5. The data storage device of claim 1, further comprising:
a data link configured for at least one protocol for communication with the host computer system, wherein:
the at least one reference data structure comprises a protocol commands data structure;
the protocol commands data structure is configured to store protocol level commands for the at least one protocol; and
comparing the user data for the write command includes comparing the user data to the protocol level commands to detect protocol commands in the user data.

6. The data storage device of claim 1, wherein the at least one reference data structure comprises a malicious file extensions and uniform resource locator's (URL) schemes data structure to store data indicative of malicious file extensions and URL schemes.

7. The data storage device of claim 1, wherein the at least one reference data structure comprises a digital signatures data structure to store digital signatures or keyed hash message authentication code data indicative of authorized firmware.

8. The data storage device of claim 1, further comprising a write-protect switch configured to prevent data being written to the at least one file system control block by malicious software and/or malicious code.

9. A method comprising:
storing, on a non-volatile storage medium of a data storage device:
at least one file system control block, the file system control block comprising a first partition of the non-volatile storage medium configured to store:
firmware of the data storage device; and
at least one reference data structure comprised of records for malicious data; and
in a second partition of the non-volatile storage medium, user data blocks to store user data from a host computer system, wherein:
a device controller in the data storage device controls the at least one file system control block; and
the host computer system controls the user data blocks through storage commands to the data storage device;
receiving, by the data storage device and from the host computer system, a write command for user data for the user data blocks;
scanning, from a buffer configured to temporarily store user data in the data storage device prior to transferring the user data to the non-volatile storage medium, the user data for the write command to detect protocol commands or malicious data, wherein scanning comprises comparing the user data for the write command to the records in the at least one reference data structure in the first partition; and
stopping the transfer of user data from the buffer to the second partition of the non-volatile storage medium responsive to at least one of protocol commands or malicious data being detected in the user data for the write command.

10. The method of claim 9, further comprising:
scanning, by the device controller in the data storage device, firmware stored on the file system control block for malicious data and safe data, wherein scanning comprises:
generating, by the device controller in the data storage device, at least one digital signature for the firmware in the at least one file system control block; and
comparing the at least one digital signature for the firmware to at least one digital signature for the firmware in the at least one reference data structure to determine the malicious data and remaining safe data;

responsive to malicious data being detected in the file system control block:
  compacting, by the device controller in the data storage device, any remaining safe data to a destination data block in the second partition of the non-volatile storage medium; and
  securely erasing, by the device controller in the data storage device, the malicious data from the file system control block; and
transmitting a notification to a user of the data storage device responsive to the at least one digital signature generated by the device controller not matching with the at least one digital signature in the at least one reference data structure.

11. The method of claim 10, wherein comparing the at least one digital signature to the at least one reference data structure comprises comparing the at least one digital signature to a digital signatures data structure to detect digital signatures data stored in the digital signatures data structure.

12. The method of claim 10, wherein the notification comprises information prompting a user associated with the data storage device to update the firmware.

13. The method of claim 10, wherein the notification comprises a message prompting the user to authorize a full flash update of the firmware stored on the file system control block.

14. The method of claim 10, wherein the data storage device is associated with a write-protect switch, and wherein scanning the firmware stored on the file system control block is responsive to the write-protect switch being disabled.

15. The method of claim 14, further comprising:
responsive to the user authorizing a full flash update of the firmware, enabling the write-protect switch for the file system control block.

16. The method of claim 10, further comprising:
responsive to detecting that the at least one digital signature does not match with a digital signature in the at least one reference data structure, updating the at least one reference data structure to store malware signatures indicative of the detected malicious data.

17. The method of claim 10, further comprising:
responsive to detecting that the at least one digital signature does not match with a digital signature in the at least one reference data structure, updating the firmware.

18. The method of claim 10, further comprising:
updating configuration files of the data storage device responsive to the user authorizing a full flash update of the firmware, wherein the file system control block further comprises the configuration files.

19. The method of claim 18, further comprising:
restoring original configuration files on the file system control block during the full flash update of the firmware.

20. A data storage device comprising:
a non-volatile storage medium;
means for storing at least one file system control block, the file system control block comprising a first partition of the non-volatile storage medium configured to store:
  firmware of the data storage device; and
  at least one reference data structure comprised of records for protocol commands or malicious data;
means for storing, in a second partition of the non-volatile storage medium, user data blocks configured to store user data from a host computer system, wherein:
  a device controller in the data storage device controls the at least one file system control block; and
  the host computer system controls the user data blocks through storage commands to the data storage device;
means for writing the firmware of the data storage device and the at least one reference data structure to the first partition;
means for writing the user data blocks to the second partition;
means for temporarily storing user data transferred from the host computer system to the means for storing the user data blocks;
means for scanning, from the means for temporarily storing the user data and by the device controller in the data storage device, the user data for each write command in the means for temporarily storing the user data for protocol commands or malicious data, wherein scanning comprises comparing the user data for each write command to the records in the at least one reference data structure in the first partition; and
means for stopping the data transfer of the user data from the means for temporarily storing the user data to the second partition responsive to at least one of protocol commands or malicious data being detected in the user data for at least one write command.

* * * * *